(12) United States Patent
Dong et al.

(10) Patent No.: US 11,837,006 B2
(45) Date of Patent: Dec. 5, 2023

(54) HUMAN POSTURE DETERMINATION METHOD AND MOBILE MACHINE USING THE SAME

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Chuqiao Dong, Pasadena, CA (US); Dan Shao, San Gabriel, CA (US); Zhen Xiu, Chino Hills, CA (US); Dejun Guo, San Gabriel, CA (US); Huan Tan, Pasadena, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 265 days.

(21) Appl. No.: 17/364,743

(22) Filed: Jun. 30, 2021

(65) Prior Publication Data
US 2023/0004739 A1 Jan. 5, 2023

(51) Int. Cl.
*G06V 40/10* (2022.01)
*G06T 7/73* (2017.01)
*G06V 10/46* (2022.01)

(52) U.S. Cl.
CPC ............. *G06V 40/10* (2022.01); *G06T 7/74* (2017.01); *G06V 10/462* (2022.01);
(Continued)

(58) Field of Classification Search
CPC .. G06V 40/10; G06V 10/462; G06V 2201/12; G06V 40/103; G06T 7/74;
(Continued)

(56) References Cited

U.S. PATENT DOCUMENTS

2019/0347826 A1* 11/2019 Zhang ...................... G06N 3/08
2020/0226787 A1* 7/2020 Tsunashima ............ G01P 15/18

FOREIGN PATENT DOCUMENTS

CN 109740513 A 5/2019
CN 109740513 B * 11/2020
(Continued)

OTHER PUBLICATIONS

ISR for PCT/CN2022/085318.
Written opinions of ISA for PCT/CN2022/085318.

*Primary Examiner* — Oneal R Mistry
*Assistant Examiner* — Vaisali Rao Koppolu

(57) ABSTRACT

Human posture determination is disclosed. Human posture is determined by obtaining range image(s) through a range camera, detecting key points of an estimated skeleton of a human in color data of the range image(s) and calculating positions of the detected key points based on depth data of the range image(s), choosing a feature map from a set of predefined feature maps based on the detected key points among a set of predefined key points, obtaining two features of a body of the human corresponding to the chosen feature map based on the positions of the detected key points, and determining a posture of the human according to the two features in the chosen feature map.

20 Claims, 13 Drawing Sheets

(52) U.S. Cl.
    CPC ............... *G06T 2207/10024* (2013.01); *G06T 2207/10028* (2013.01); *G06T 2207/30196* (2013.01)

(58) Field of Classification Search
    CPC . G06T 2207/10024; G06T 2207/10028; G06T 2207/30196
    See application file for complete search history.

(56) References Cited

FOREIGN PATENT DOCUMENTS

| | | | |
|---|---|---|---|
| CN | 111931733 A | * | 11/2020 |
| CN | 111931733 A | | 11/2020 |

* cited by examiner

US 11,837,006 B2

HUMAN POSTURE DETERMINATION METHOD AND MOBILE MACHINE USING THE SAME

BACKGROUND

1. Technical Field

The present disclosure relates to human posture determination, and particularly to a human posture determination method and a mobile machine using the same.

2. Description of Related Art

With the help of flourishing artificial intelligence (AI) techniques, mobile robots have been used in various scenes of daily life to provide various services such as healthcare, housework, and transportation. Taking healthcare as an example, mobility aid robots are often designed as devices like walkers or wheelchairs to assist walking and otherwise so as to improve the mobility of people with a mobility impairment.

In addition to automatic navigation which can assist a user in a more automatic and convenient way, in order to serve the user in a more appropriate manner, a mobility aid robot is inevitable to detect the user's posture so as to serve accordingly. Skeleton-based posture detection is a popular technique for realizing human posture detections, which detects the posture of a human according to the identified key points of an estimated skeleton of the human.

In the case that there have enough identified key points, it will be effective and can detect accurately; otherwise, in the case that the key points can be identified are not enough because, for example, the body of the human is occluded by obstacles or cloths, the efficiency of the detections will be affected. Especially when the human sits behind a furniture or lies down in a bed and covered with a quilt, the furniture or the quilt may occlude the body and affect the effect of detection. Therefore, a human posture determination method that is adaptable to different sets of detected key points is need.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1:
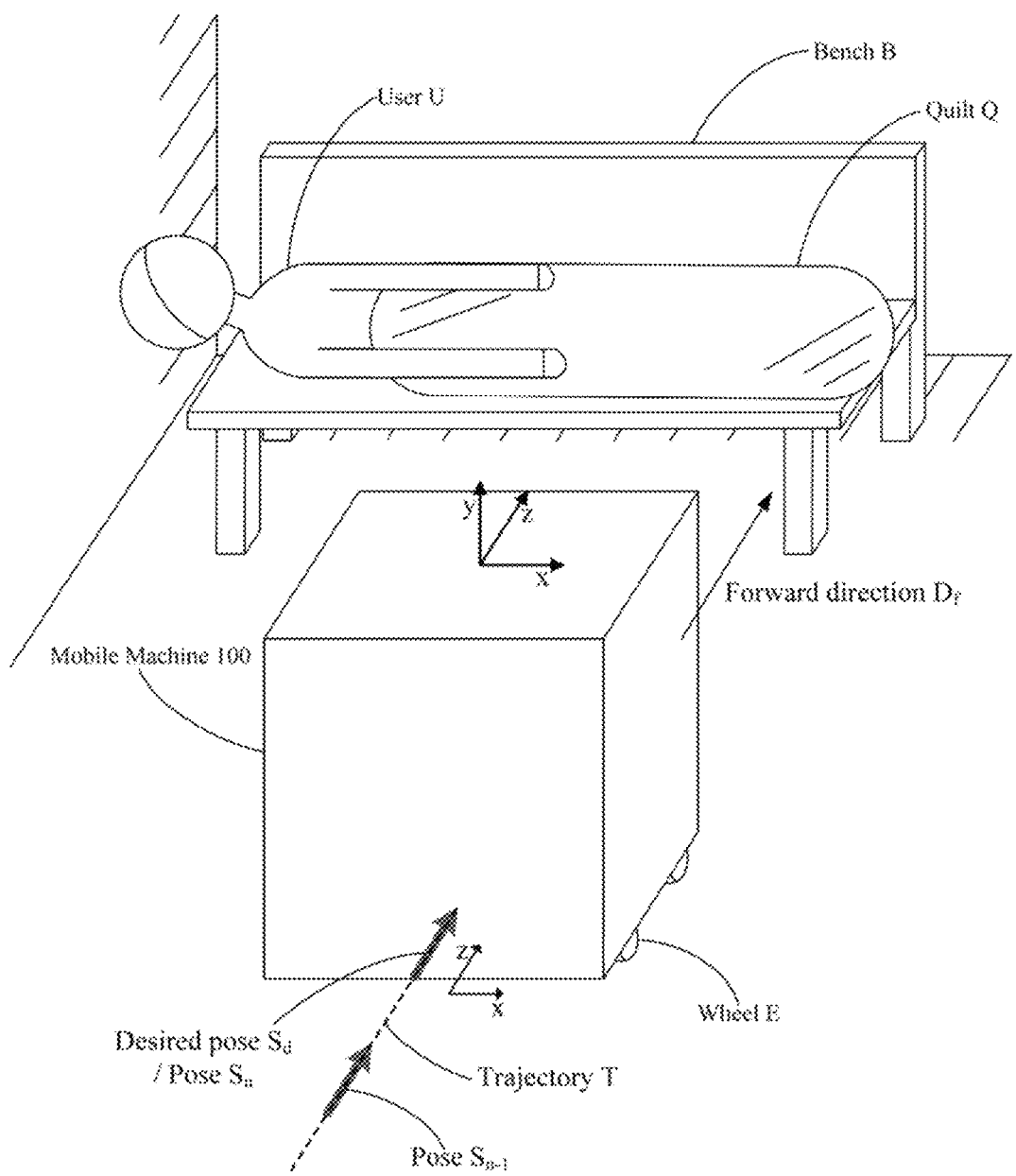
FIG. 1 is a schematic diagram of a scenario of detecting human posture using a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first". "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to mobile machine navigating. As used herein, the term "human" refers to the most populous and widespread species of primates in the earth. A human has a body including a head, a neck, a trunk, arms, hands, legs and feet. The term "posture" refers to a human position such as standing, sitting, and lying. The term "determination" refers to the judgment of the state (e.g., the posture) of a specific objective (e.g., a human) by calculating based on the related data (e.g., the image including the human). The term "mobile machine" refers to a machine such as a mobile robot or a vehicle that has the capability to move around in its environment. The term "sensor" refers to a device, module, machine, or subsystem such as ambient light sensor and image sensor (e.g., camera) whose purpose is to detect events or changes in its environment and send the information to other electronics (e.g., processor).

FIG. 1 is a schematic diagram of a scenario of detecting human posture using a mobile machine 100 according to some embodiments of the present disclosure. As shown in FIG. 1, the mobile machine 100 that is navigated in its environment (e.g., a room) detects the posture of a human, that is, the user U. The mobile machine 100 is a mobile robot (e.g., a mobility aid robot), which includes a camera C and wheels E. The camera C may be disposed toward a forward direction $D_f$ which the mobile machine 100 straightly moves such that lens of the camera C straightly face toward the forward direction $D_f$. The camera C has a camera coordinate system, and the coordinates of the mobile machine 100 are consistent with the coordinates of the camera C. In the camera coordinate system, the x-axis is parallel to the horizon, the y-axis is perpendicular to the horizon, and the z-axis is consistent with the forward direction $D_f$. It should be noted that, the mobile machine 100 is only one example of mobile machine, and the mobile machine 100 may have more, fewer, or different parts than shown in above or below (e.g., have legs rather than the wheels E), or may have a different configuration or arrangement of the parts (e.g., have the camera C dispose on the top of the mobile machine 100). In other embodiments, the mobility machine 100 may be another kind of mobile machine such as a vehicle.

Figure 2:
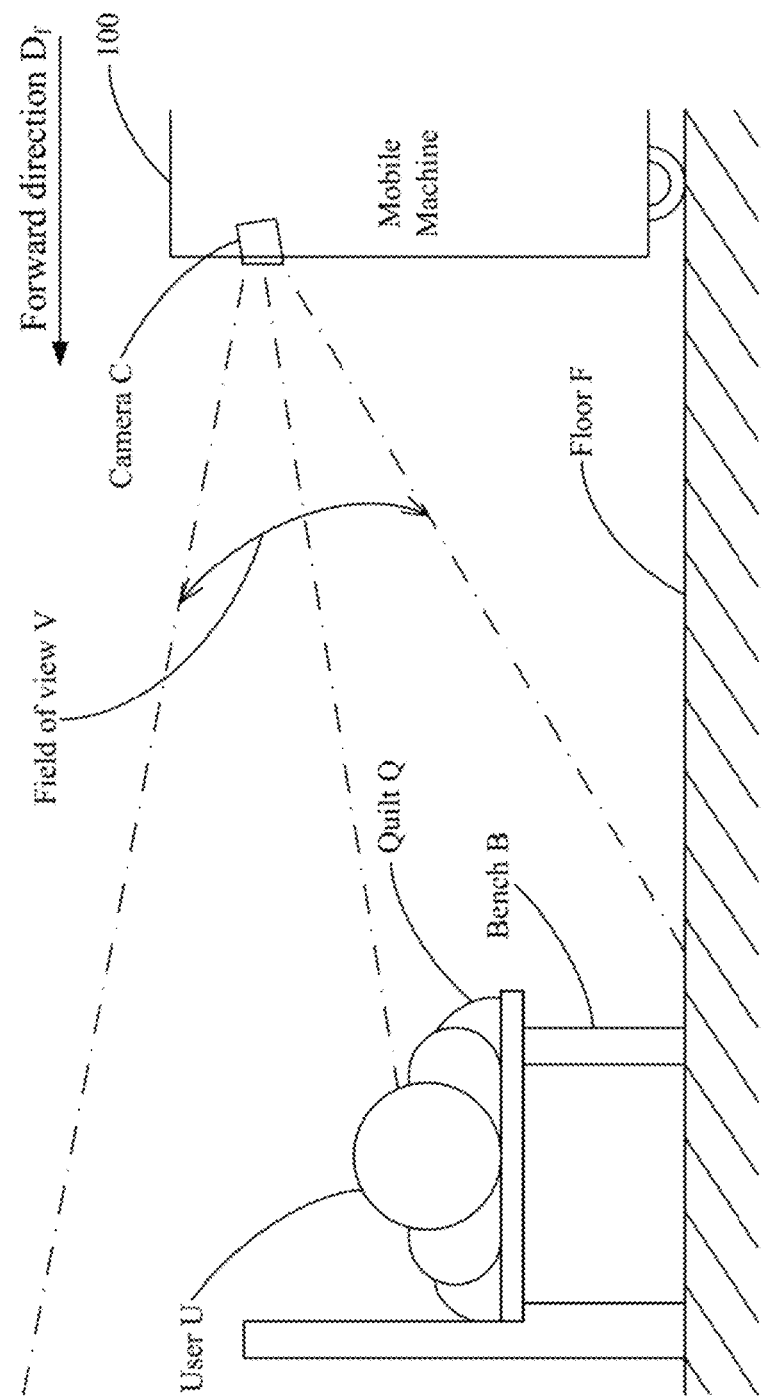
FIG. 2 is a schematic diagram of using a camera of the mobile machine of FIG. 1 to detect the posture of a human.

FIG. 2 is a schematic diagram of using the camera C of the mobile machine 100 of FIG. 1 to detect the posture of a human. A field of view (FOV) V of the camera C covers both the user U, a quilt Q covering on the user U, and a bench B on which the user U is sitting. The height (e.g., 1 meter) of the camera C on the mobile machine 100 may be changed according to actual needs (e.g., larger height to have the larger field of view V and smaller height to have the smaller field of view V), and the pitch angle of the camera C with respect to the floor F may also be changed according to actual needs (e.g., larger pitch angle to have the nearer field of view V and smaller pitch angle to have the farer field of view V). Based on the height and the pitch angle of the camera C, a relative position of the user U (and/or the bench B) near the mobile machine 100 can be obtained, and then the posture of the user U can be determined.

In some embodiments, the mobile machine 100 is navigated in the environment while dangerous situations such as collisions and unsafe conditions (e.g., falling, extreme temperature, radiation, and exposure) may be prevented. In this indoor navigation, the mobile machine 100 is navigated from a starting point (e.g., the location where the mobile machine 100 originally locates) to a destination (e.g., the location of the goal of navigation which is indicated by the user U or the navigation/operation system of the mobile machine 100), and obstacles (e.g., walls, furniture, humans, pets, and garbage) may be avoided so as to prevent the above-mentioned dangerous situations. In the navigation, target finding (e.g., human finding or user identifying) may be considered to help to find the user U, and occlusion (e.g., furniture and cloth) avoidance may also be considered to improve the efficiency of human posture determination. The trajectory (e.g., trajectory T) for the mobile machine 100 to move from the starting point to the destination has to be planned so as to move the mobile machine 100 according to the trajectory. The trajectory includes a sequence of poses (e.g., poses $S_{n-1}$-$S_n$ of trajectory T). In some embodiments, for realizing the navigation of the mobile machine 100, the map for the environment has to be built, the current position of the mobile machine 100 in the environment may have to be determined (using, for example, the IMU 1331), and trajectories may be planned based on the built map and the determined current position of the mobile machine 100. The desired pose $S_d$ is the last of the sequence of poses S in a trajectory T (only shown partially in the figure), that is, the end of the trajectory T. The trajectory T is planned according to, for example, a shortest path in the built map to the user U. In addition, the collision avoidance to obstacles in the built map (e.g., walls and furniture) or that detected in real time (e.g., humans and pets) may also be considered when planning, so as to accurately and safely navigate the mobile machine 100. It should be noted that, the starting point and the destination only refer to the locations of the mobile machine 100, rather than the real beginning and end of the trajectory (the real beginning and end of a trajectory should be a pose, respectively). In addition, the trajectory T shown in FIG. 1 is only a part of the planned trajectory 1.

In some embodiments, the navigation of the mobile machine 100 may be actuated through the mobile machine 100 itself (e.g., a control interface on the mobile machine 100) or a control device such as a remote control, a smart phone, a tablet computer, a notebook computer, a desktop computer, or other electronic device by, for example, providing a request for the navigation of the mobile machine 100. The mobile machine 100 and the control device may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks.

Figure 3:
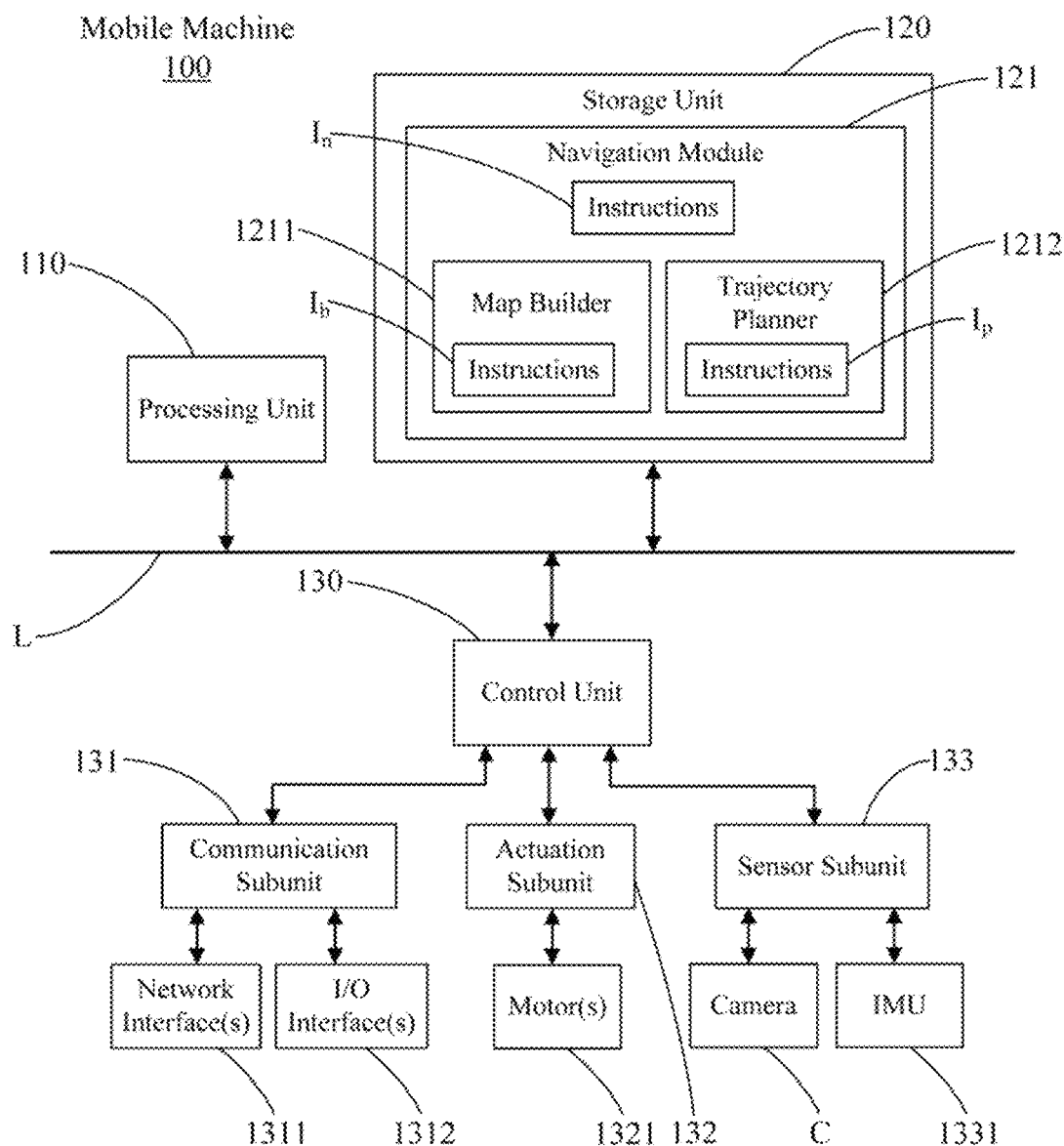
FIG. 3 is a schematic block diagram illustrating the mobile machine of FIC 1.

FIG. 3 is a schematic block diagram illustrating the mobile machine 100 of FIG. 1. The mobile machine 100 may include a processing unit 110, a storage unit 120, and a control unit 130 that communicate over one or more communication buses or signal lines L. It should be noted that, the mobile machine 100 is only one example of mobile machine, and the mobile machine 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobile machine 100, which may be stored in the one or more memories (and the one or more non-transitory computer readable storage media).

The navigation module 121 in the storage unit 120 of the mobile machine 10 may be a software module (of the operation system of the mobile machine 100), which has instructions $I_n$ (e.g., instructions for actuating motor(s) 1321 of the wheels E of the mobile machine 100 to move the mobile machine 100) for implementing the navigation of the mobile machine 100, a map builder 1211, and trajectory planner(s) 1212. The map builder 1211 may be a software module having instructions $I_b$ for building map for the mobile machine 100. The trajectory planner(s) 1212 may be software module(s) having instructions $I_p$ for planning trajectories for the mobile machine 100. The trajectory planner(s) 1212 may include a global trajectory planner for planning global trajectories (e.g., trajectory T) for the mobile machine 100 and a local trajectory planner for planning local trajectories (e.g., the part of the trajectory T in FIG. 1) for the mobile machine 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory, and other data collected by the mobile machine 100. For example, images may be collected through the camera C of the mobile machine 100, and the collected images may be analyzed so as to identify obstacles, so that the local trajectory can be planned with reference to the identified obstacles, and the obstacles can be avoided by moving the mobile machine 10 according to the planned local trajectory.

Each of the map builder 1211 and the trajectory planner(s) 1212 may be a submodule separated from the instructions $I_n$ or other submodules of the navigation module 121, or a part of the instructions $I_n$ for implementing the navigation of the mobile machine 100. The trajectory planner(s) 1212 may further have data (e.g., input/output data and temporary data) related to the trajectory planning of the mobile machine 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobile machine 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted).

In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device via the network, I/O interface(s) 1312 (e.g., a physical button), and the like. The actuation subunit 132 is coupled to component(s)/device(s) for implementing the motions of the mobile machine 100 by, for example, actuating motor(s) 1321 of the wheels E and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

The mobile machine 100 may further include a sensor subunit 133 which may include a set of sensor(s) and related controller(s), for example, the camera C, and an IMU 1331 (or an accelerometer and a gyroscope), for detecting the environment in which it is located to realize its navigation. The camera C may be a range camera producing range images. The range image(s) include color data for representing the colors of pixels in the image and depth data for representing the distance to the scene object in the image. In some embodiments, the camera C is an RGB-D camera, which produces RGB-D image pairs each including an RGB image and a depth image, where the RGB image includes pixels each represented as red, green and blue colors, and the depth image includes pixels each having the value for representing the distance to the scene object (e.g., a human or a furniture). The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

In some embodiments, the map builder 1211, the trajectory planner(s) 1212, the sensor subunit 133, and the motor(s) 1321 (and the wheels E and/or joints of the mobile machine 100 coupled to the motor(s) 1321) jointly compose a (navigation) system which implements map building, (global and local) trajectory planning, and motor actuating so as to realize the navigation of the mobile machine 100. In addition, the various components shown in FIG. 2B may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 4:
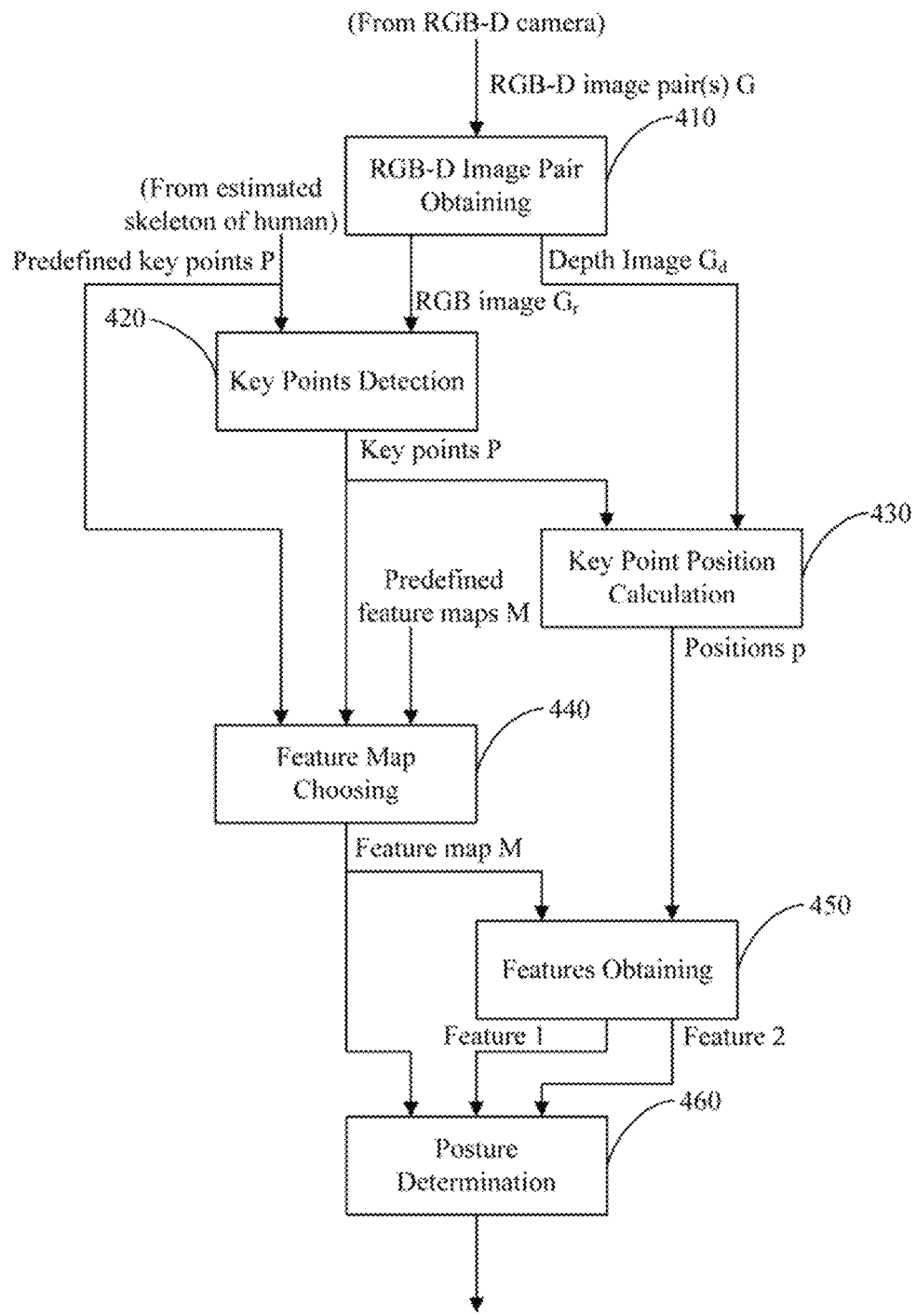
FIG. 4 is a schematic block diagram of an example of detecting human posture using the mobile machine of FIG. 1.

FIG. 4 is a schematic block diagram of an example of detecting human posture using the mobile machine 100 of FIG. 1. In some embodiments, a human posture determination method may be implemented in the mobile machine 100 by, for example, storing (sets of) the instructions $I_n$ corresponding to the human posture determination method as the navigation module 121 in the storage unit 120 and executing the stored instructions $I_n$ through the processing unit 110, and then the mobile machine 100 can detect using the camera C so as to determine the posture of the user U. The human posture determination method may be performed in response to, for example, a request for detecting the posture of the user U from, for example, (the navigation/operation system of) the mobile machine 100 itself or the control device, then it may also be re-performed, for example, in every predetermined time interval (e.g., 1 second) to detect the change of the posture of the user U. According to the human posture determination method, the processing unit 110 may obtain RGB-D image pair(s) G through the camera C (block 410 of FIG. 4). The camera C captures image pair(s) G each including an RGB image $G_f$ and a depth image $G_d$. The RGB image $G_r$ includes color information for representing the colors making up an image, and the depth image $G_d$ includes depth information for representing a distance to the scene object (e.g., the user U or the bench B) in the image. In some embodiments, a plurality of image pairs G may be obtained so as to select one image pair G (e.g., the image pair G that meets a certain quality) for use.

The processing unit 110 may further detect key points P of an estimated skeleton N (see FIG. 6) of the user U in the RGB image $G_r$ (block 420 of FIG. 4). The key points P in the RGB image $G_r$ may be identified to obtain two dimensional (2D) positions of the key points P on the estimated skeleton N of the user U. The estimated skeleton N is a pseudo human skeleton for determining human postures (e.g., standing, sitting, and lying), which has a set of predefined key points P each representing a joint (e.g., knee) or an organ (e.g., ear). In some embodiments, the predefined key points P may include 18 key points, that is, two eye key points, a nose key point, two ear key points, a neck key point, two shoulder key points $P_s$ (see FIG. 6), two elbow key points, two wrist key points, two hip key points $P_h$ (see FIG. 6), two knee key points $P_k$ (see FIG. 6), and two foot key points, where the two eye key points, the nose key point, and the two ear key points are also referred to as head key points $P_d$ (not shown. The processing unit 110 may further calculate the positions of the detected key points P based on the depth image $G_d$ (block 430 of FIG. 4). The depth information in the depth image $G_d$ that corresponds to the key points P may be combined with the obtained 2D positions of the key points P so to obtain the three dimensional (3D) positions of the key points P.

Figure 5A:
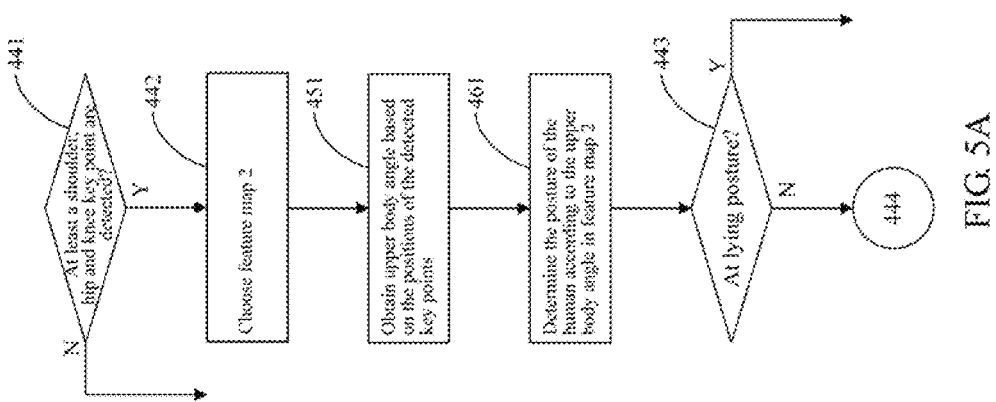
FIGS. 5A and 5B is a flow chart of a posture determination process on the basis of detected key points.
Figure 5B:
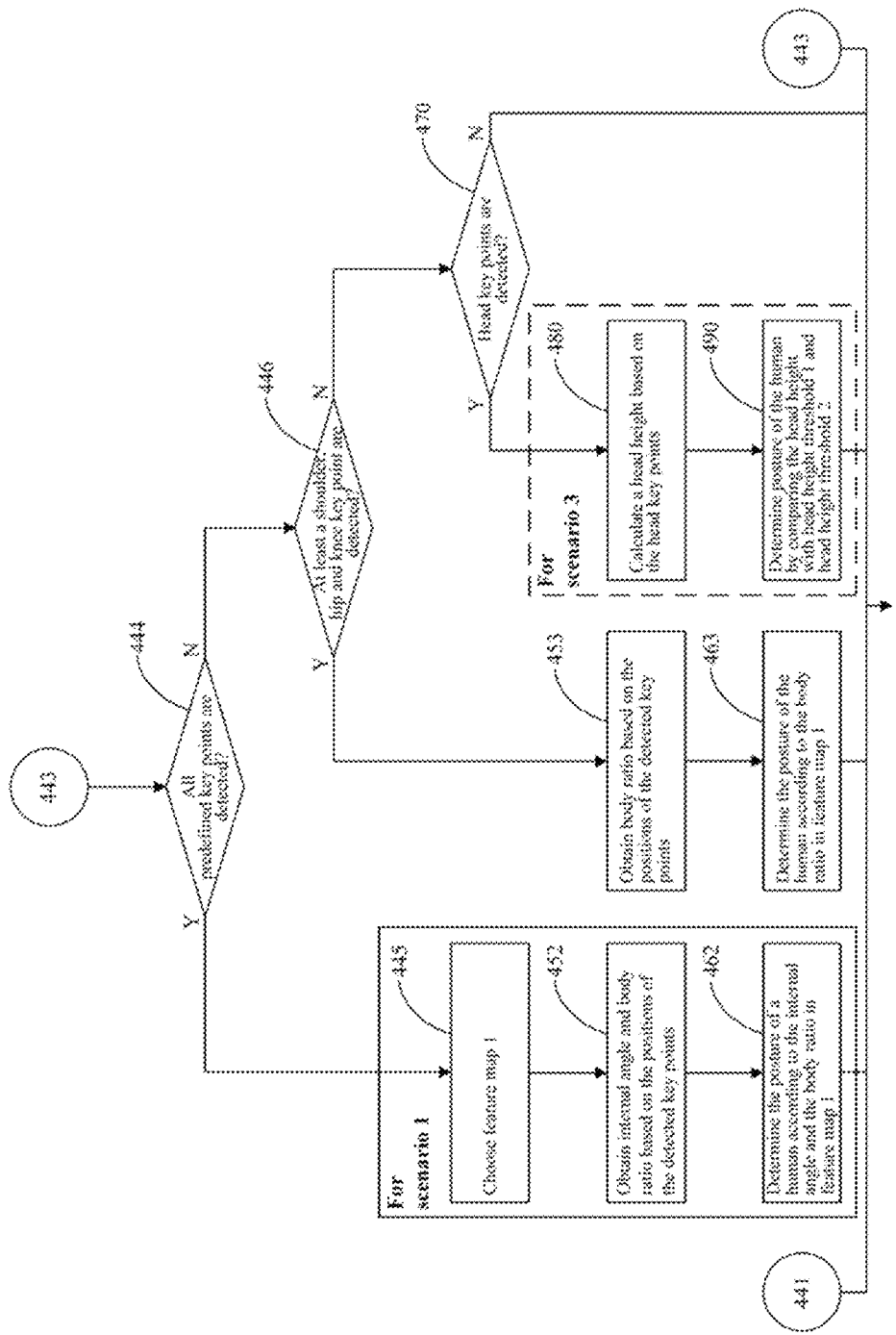

The processing unit 110 may further choose a feature map M from a set of predefined feature maps M based on the detected key points P among the predefined key points P (block 440 of FIG. 4). A set of predefined feature maps M may be stored in the storage unit 120 in advance. Each feature map M (e.g., feature map 1 in FIG. 7) is a self-defined map which includes values corresponding to features (e.g., internal angle and body ratio in FIG. 7) for distinguishing postures, which can be used to classify the detected key points P so as to realize the distinguishing of postures. A clear separation of postures in the feature map M may be reached with the maximum margin from each posture region in the feature map M. FIGS. 5A and 5B are a flow chart of a posture determination process on the basis of the detected key points P. In the posture determination process, the posture of the user U is determined on the basis of detected key points P. In addition to distinguishing postures by using a feature map M to classify the detected key points P in the case that all or a specific part of the predefined key points are detected as in the above-mentioned human posture determination method (the process of classifying postures by using a feature map M on the key points P in individual image pair G is called "classifier") (steps 441-446, 452-453, and 462-463), the posture determination process further distinguishes postures using the detected head key points $P_d$ in the case that all or the specific part of the predefined key points are not detected but the head key points $P_d$ are detected (steps 470-490). The posture determination process may be incorporated into the above-mentioned human posture determination method.

In some embodiments, for choosing a feature map M (block 440 of FIG. 4), at step 441, a determination is made whether or not the detected key points P include at least a shoulder key point $P_s$, at least a hip key point $P_h$, and at least a knee key point $P_k$ among the predefined key points P. If the detected key points P include at least a shoulder key point $P_s$, at least a hip key point $P_h$, and at least a knee key point $P_k$, step 442 will be performed; otherwise, the method will be ended. At step 442, feature map 2 is chosen from the set of predefined feature maps M. FIG. 9 is a schematic diagram of feature map 2 for the scenario of FIG. 8. Feature map 2 is for the two features of a body ratio and an upper body angle, and includes threshold curve β which is a polynormal curve for distinguishing a standing posture and a sitting posture, and threshold curve γ which is a polynormal curve for distinguishing a lying posture, the standing posture, and the sitting posture. Since the internal angle is no more valid in this scenario and lying postures overlap with standing/siting postures in the values of the body ratio, the upper body angle is introduced in feature map 2. It should be noted that, for better performance of posture determination, the feature values shown in feature map 2 are also normalized value with mean and scale. After step 442, step 451 and step 461 will be performed sequentially to determine the posture of the user U. At step 443, a determination is made whether or not the determined posture is the lying posture. If no, step 444 will be performed; otherwise, the method will be ended.

Figure 6:
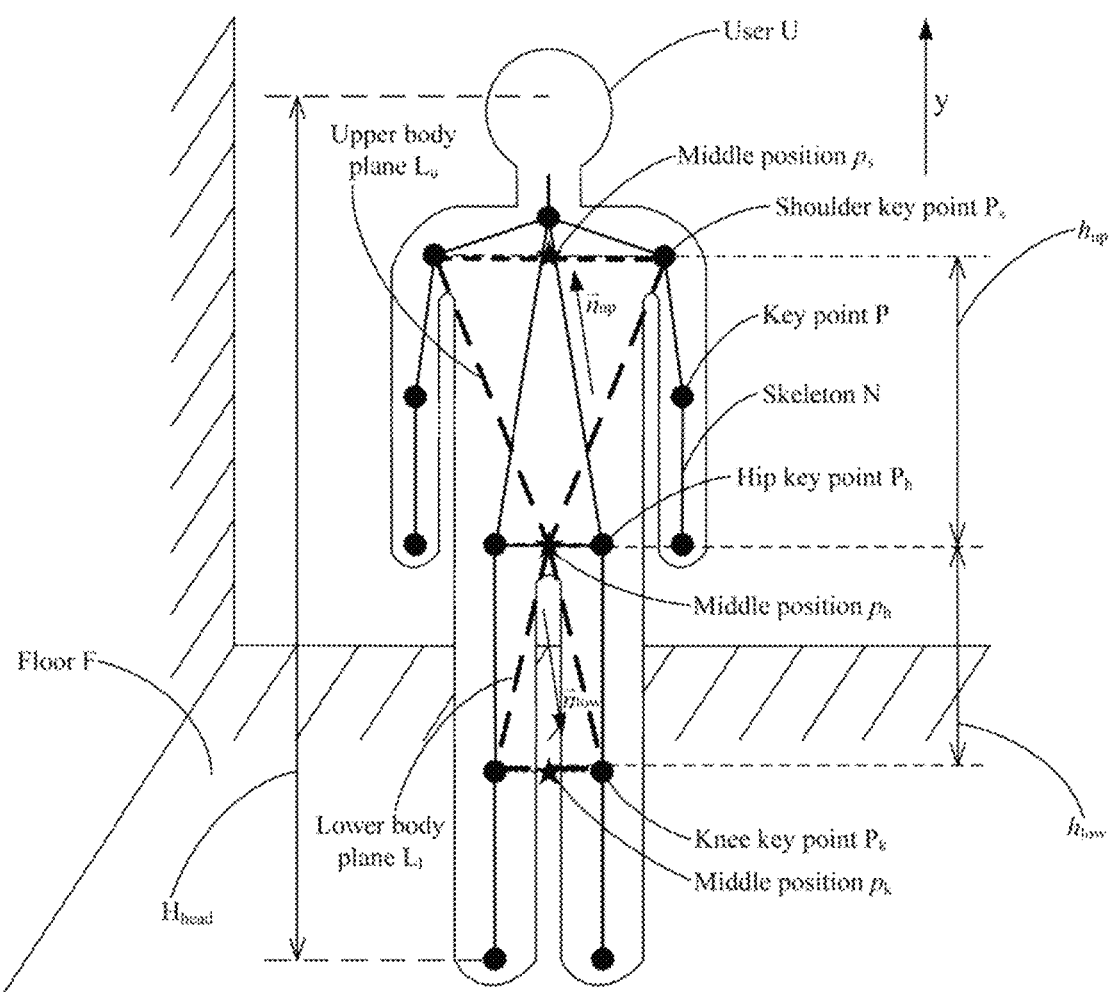
FIG. 6 is a schematic diagram of scenario 1 of the posture determination of FIGS. 5A and 5B.
Figure 7:
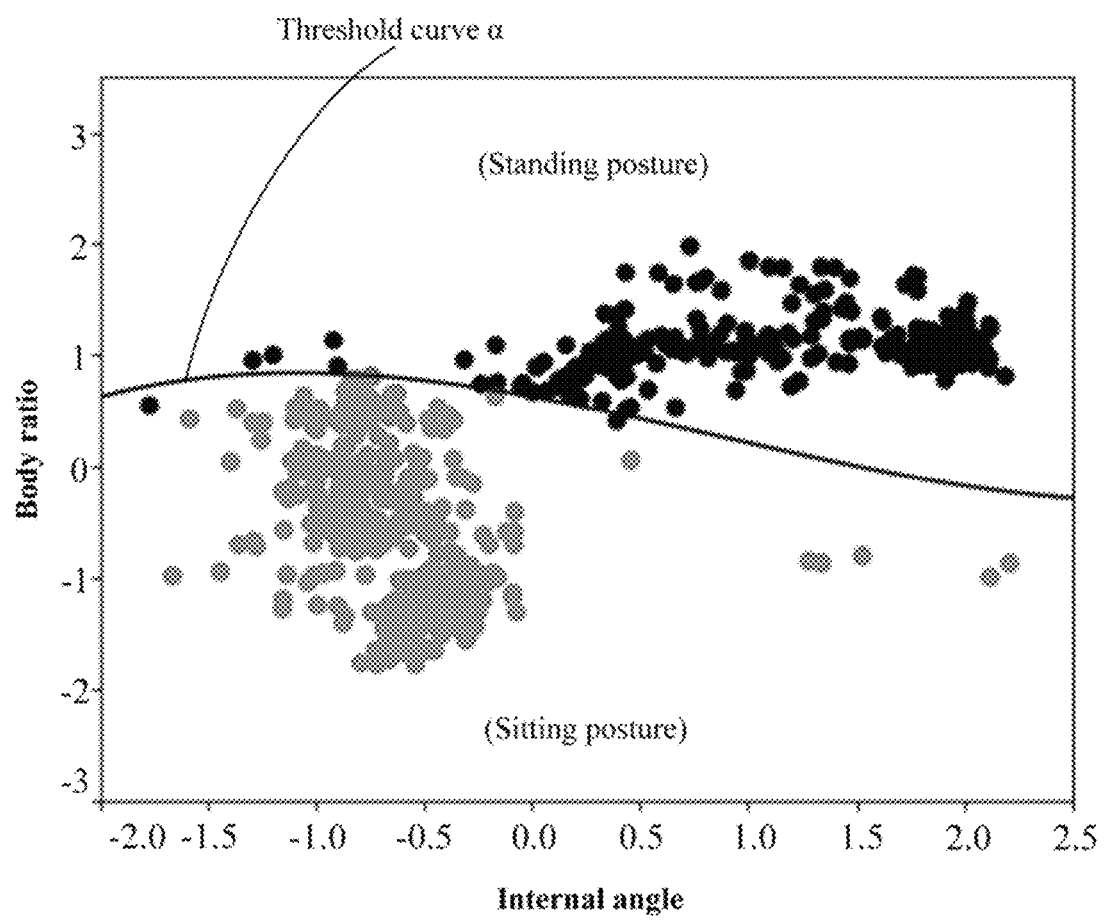
FIG. 7 is a schematic diagram of feature map 1 for the scenario of FIG. 6.

At step 444, a determination is made whether or not the detected key points P include all the predefined key points P. FIG. 6 is a schematic diagram of scenario 1 of the posture determination of FIGS. 5A and 5B. In scenario 1, all the predefined key points P are detected, and steps 445, 452, and 462 in FIGS. 5A and 5B will be performed to determine the posture of the user U. For instance, because the user U in FIG. 6 stands at attention before the camera C of the mobile machine 100 and there is no obstacle therebetween, all the above-mentioned 18 predefined key points P can be detected. It should be noted that, the 5 head key points $P_d$ (i.e., the two eye key points, the nose key point, and the two ear key points) are not shown in the figure. If the detected key points P include all the predefined key points P (e.g., the detected key points P include all the above-mentioned 18 predefined key points), step 445 will be performed; otherwise, step 446 will be performed. At step 445, feature map 1 is chosen from the set of predefined feature maps M. FIG. 7 is a schematic diagram of feature map 1 for the scenario of FIG. 6. Feature map 1 is for the two features of an internal angle and a body ratio, and includes threshold curve α which is a polynormal curve for distinguishing a standing posture and a sitting posture. Because a much higher possibility of occlusion in lying postures than standing and sitting postures, only standing and sitting postures are considered in scenario 1 that all the predefined key points P are detected. It should be noted that, for better performance of posture determination, the feature values shown in feature map 1 are normalized value with mean and scale. At step 446, a determination is made whether or not the detected key points P include at least a shoulder key point $P_s$, least a hip key point $P_h$, and at least a knee key point $P_k$ among the predefined key points P.

Figure 8:
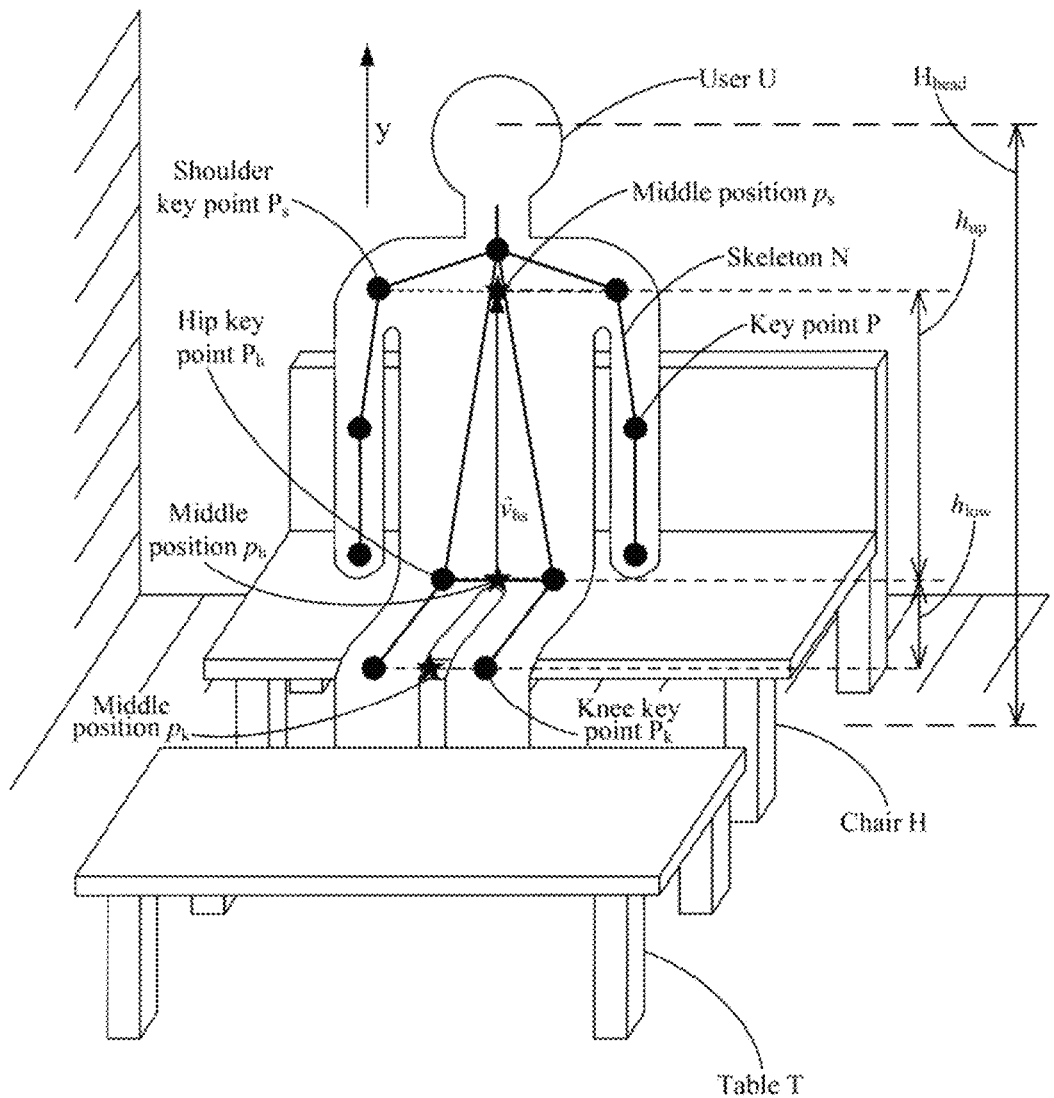
FIG. 8 is a schematic diagram of scenario 2 of the posture determination of FIGS. 5A and 5R.
Figure 9:
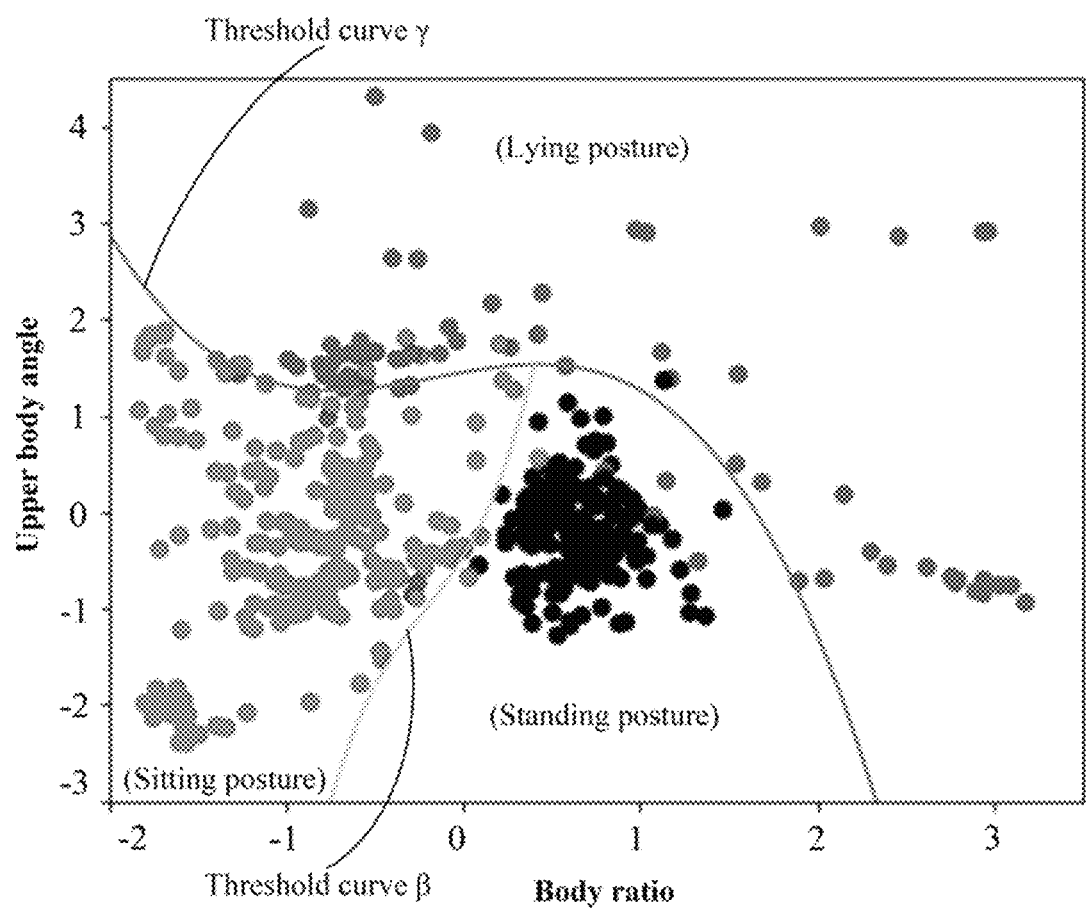
FIG. 9 is a schematic diagram of feature map 2 for the scenario of FIG. 8.

FIG. 8 is a schematic diagram of scenario 2 of the posture determination of FIGS. 5A and 5B. In scenario 2, one or two shoulder key points $P_s$, or two hip key points $P_h$, and one or two knee key points $P_k$ rather than all the predefined key points P are detected, and steps 453 and 463 in FIGS. 5A and 5B will be performed to determine the posture of the user U. For instance, because the user U in FIG. 8 sits on a chair H before the camera C of the mobile machine 100 and there is a table T that occlude a part of the body of the user U, only the two shoulder key points $P_s$, the two hip key points $P_h$, and the two knee key points $P_k$ (and the head key points $P_d$) among the above-mentioned 18 predefined key points P can detected. In one embodiment, if only one shoulder, hip or knee key point is detected, the position of the other key point may be obtained based on the position of the detected key point by, for example, using the position of the detected key point (and the position of the other detected key points) to calculate the position of the undetected key point. It should be noted that, the 5 head key points $P_d$ (i.e., the two eye key points, the nose key point, and the two ear key points) are not shown in the figure. If the detected key points P include at least a shoulder key point $P_s$, at least a hip key point $P_h$, and at least a knee key point $P_k$, step 453 will be performed; otherwise, step 470 will be performed.

The processing unit 110 may further obtain two features (i.e., feature 1 and feature 2) of a body of the human that correspond to the chosen feature map M based on the positions of the detected key points P (block 450 of FIG. 4). In some embodiments, for obtaining the feature corresponding to feature map 2, at step 451 of FIGS. 5A and 5B, a detected upper body angle (i.e., feature 2) of the body of the user U is obtained based on the positions of the detected key points P; for obtaining the two feature corresponding to feature map 1, at step 452, a detected internal angle $A_i$ (i.e., feature 1, see FIG. 10) of the body of the user U and a detected body ratio R (i.e., feature 2, see FIG. 10) of the body of the user U am obtained based on the positions of the detected key points P; and for obtaining the feature corresponding to feature map 2, at step 453, the detected body ratio R (i.e., feature 1) of the body of the user U is obtained based on the positions of the detected key points P.

Figure 10:
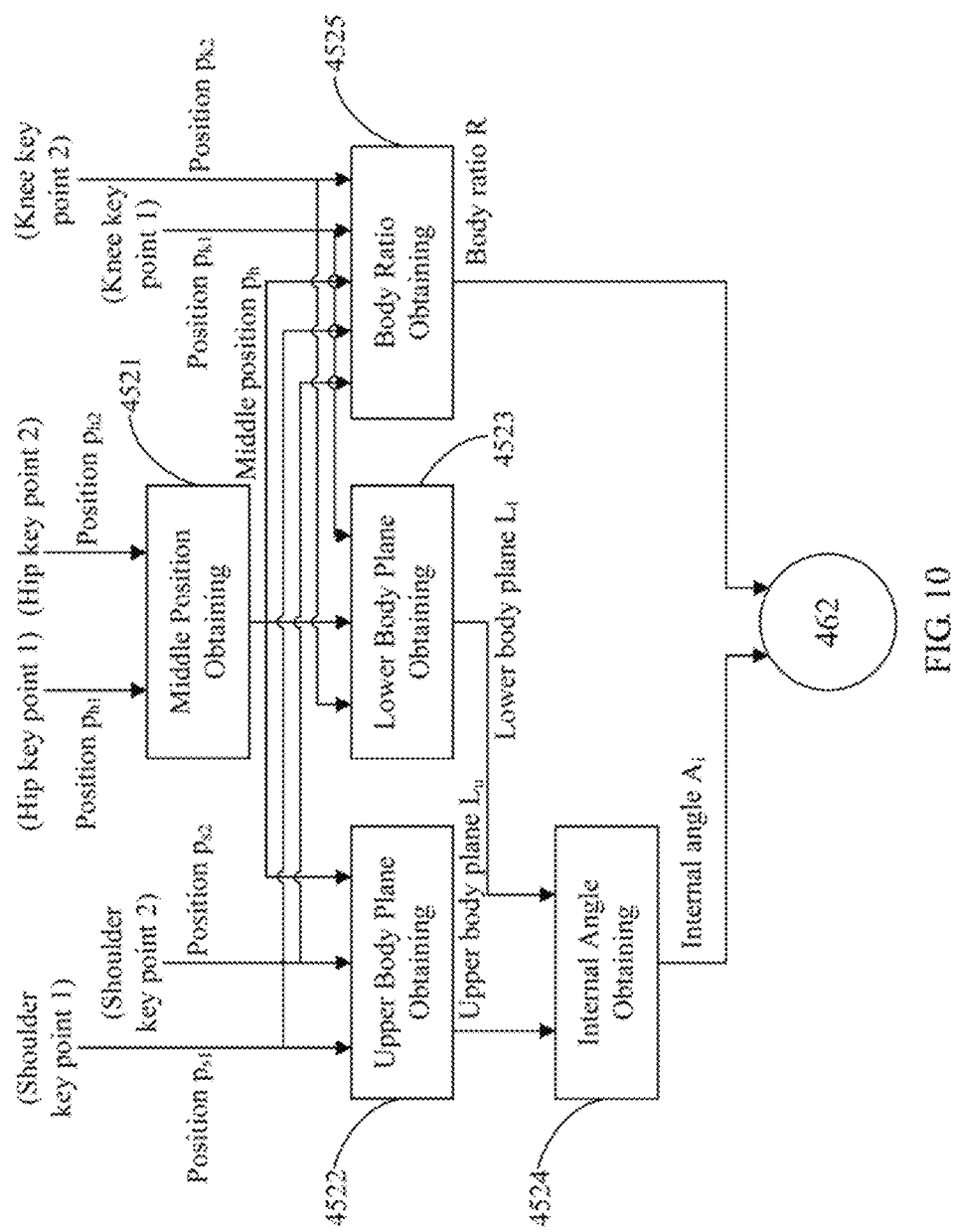
FIG. 10 is a schematic diagram of an example of obtaining a detected internal angle and a detected body ratio in the scenario of FIG. 6.

FIG. 10 is a schematic diagram of an example of obtaining the detected internal angle $A_i$ and the detected body ratio R in the scenario (i.e., scenario 1) of FIG. 6. In some embodiments, for obtaining the detected internal angle $A_i$ (i.e., feature 1) and the detected body ratio R (i.e., feature 2), the processing unit 110 may obtain a middle position $p_h$ (see FIG. 6) between the positions of the two hip key points $P_h$ among the detected key points P (block 4521 of FIG. 10). The processing unit 110 may further obtain an upper body plane $L_u$ (see FIG. 6) based on the middle position $p_h$ and the positions of the two shoulder key points $P_s$ among the detected key points (block 4522 of FIG. 10). The processing unit 110 may further obtain a lower body plane $L_1$ based on the middle position $p_h$ with the positions of two knee key points among the detected key points (block 4523 of FIG. 10). The processing unit 110 may further obtain an angle between the upper body plane and the lower body plane to take as the internal angle $A_i$ (block 4524 of FIG. 10). In one embodiment, the upper body plane $L_u$ is a plane with a normal vector of $\vec{n}_{up}$, and the lower body plane $L_1$ is a plane with a normal vector of $\vec{n}_{low}$, and the included angle between the normal vector $\vec{n}_{up}$ and the normal vector of $\vec{n}_{low}$ is take as the internal angle $A_i$. The processing unit 110 may further obtain a ratio between a lower body height $h_{low}$ (see FIG. 6) and an upper body height $h_{up}$ (see FIG. 6) to take as the body ratio R (block 4525 of FIG. 10). In one embodiment, the upper body height $h_{up}=p_s \cdot y - p_h \cdot y$ and the lower body height $h_{low}=p_h \cdot y - p_k \cdot y$, where $p_s$ is a middle position between the positions of the two shoulder key points $P_s$, $p_s \cdot y$ is a y coordinate of $p_s$, $p_h \cdot y$ is a y coordinate of $p_h$, $p_k$ is a middle position between the positions of the two knee key points $P_k$, and $p_k \cdot y$ is a y coordinate of $p_k$.

Figure 11:
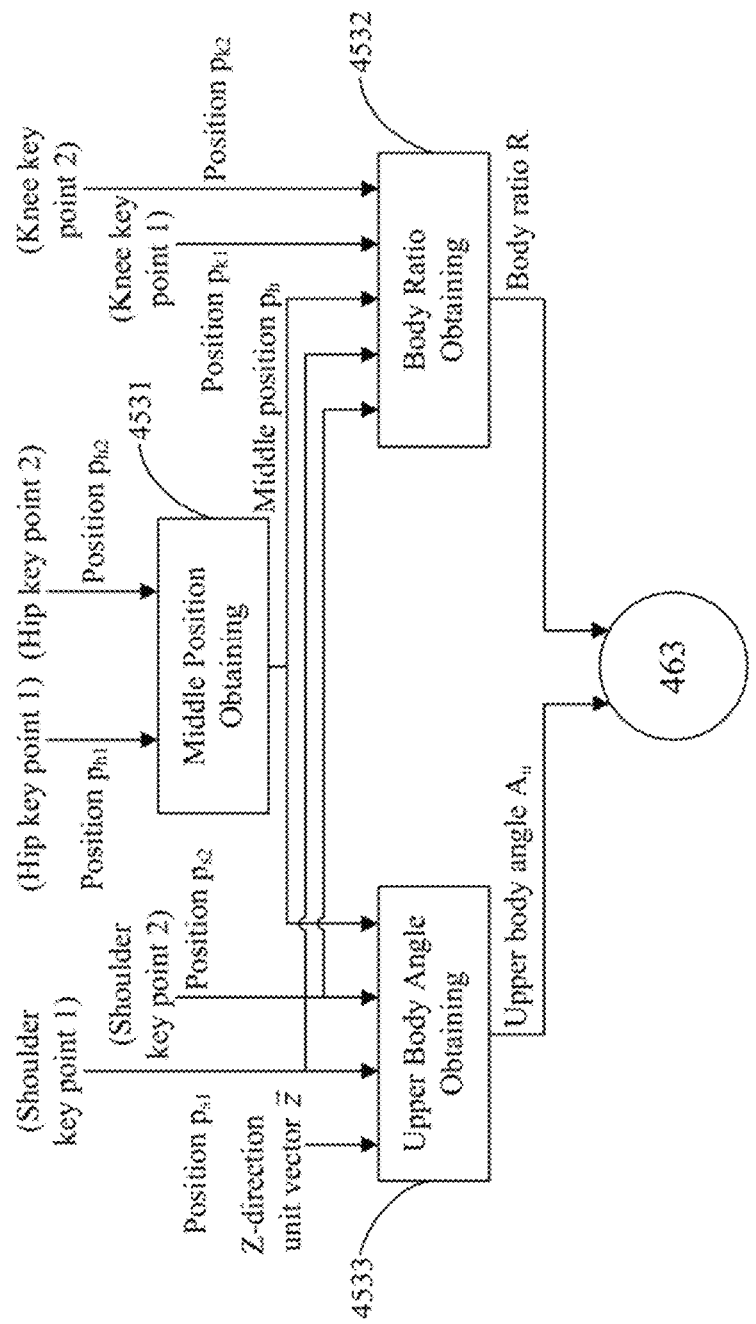
FIG. 11 is a schematic diagram of an example of obtaining a detected body ratio and a detected upper body angle in the scenario of FIG. 8.

FIG. 11 is a schematic diagram of an example of obtaining the detected body ratio R and the detected upper body angle $A_u$ in the scenario (i.e., scenario 2) of FIG. 8. In some embodiments, for obtaining the detected body ratio R (i.e., feature 1) and the detected upper body angle $A_u$ (i.e., feature 2), the processing unit 110 may obtain a middle position p between the positions of two hip key points $P_h$ among the detected key points P (block 4531 of FIG. 11). The processing unit 110 may further obtain a ratio between a lower body height $h_{low}$ and an upper body height $h_{up}$ to take as the body ratio R (block 4532 of FIG. 11), where $h_{up}=p_s \cdot y - p_h \cdot y$ and $h_{low}=p_h \cdot y - p_k \cdot y$, $p_s$ is a middle position between the positions of two shoulder key points $P_s$, $p_s \cdot y$ is a y coordinate of $p_s$, $p_h \cdot y$ is a y coordinate of $p_h$, $p_k$ is a middle position between the positions of two knee key points $P_k$, and $p_k \cdot y$ is a y coordinate of $p_k$. The processing unit 110 may further obtain an included angle between a vector $\vec{v}_{hs}$ that is between the middle position $p_h$ and the middle position $p_s$ and a unit vector $\hat{y}$ in y-direction to take as the upper body angle $A_u$ (block 4533 of FIG. 11).

The processing unit 110 may further determines the posture of the user U according to the two features (i.e., feature 1 and feature 2) in the chosen feature map M (block 460 of FIG. 4). In some embodiments, for determining the posture of the user U according to the upper body angle in feature map 2 (only distinguishing the lying posture here), at step 461, the posture of the user U is determined based on the detected upper body angle $A_u$ (i.e., feature 2). For determining the posture of the user U according to the two features (i.e., the detected internal angle $A_i$ and the detected body ratio R) of feature map 1, at step 462, the posture of the user U is determined based on a position of an intersection of the detected internal angle A, (i.e., feature 1) and the detected body ratio R (i.e., feature 2) in feature map 1. For instance, for the standing user U of FIG. 6, since the position of the intersection of the detected internal angle A, (e.g., 0.613) and the detected body ratio R (e.g., 0.84) (both are normalized values) is at a point above the threshold curve α of feature map 1 in FIG. 7, the user U will be determined as at the standing posture. For determining the posture of the user U according to the two features (i.e., the detected body ratio R and the detected upper body angle $A_u$) in feature map 2, at step 463, the posture of the user U is determined based on a position of an intersection of the detected body ratio R (i.e., feature 1) in feature map 1. For instance, for the sitting user U of FIG. 8, since the position of the intersection of the detected body ratio R (e.g., −0.14) and the detected upper body angle A. (e.g., 0.44) (both are normalized values) is at a point that is on the left the threshold curve β and below the threshold curve γ of feature map 2, the user U will be determined as at the sitting posture.

Figure 12:
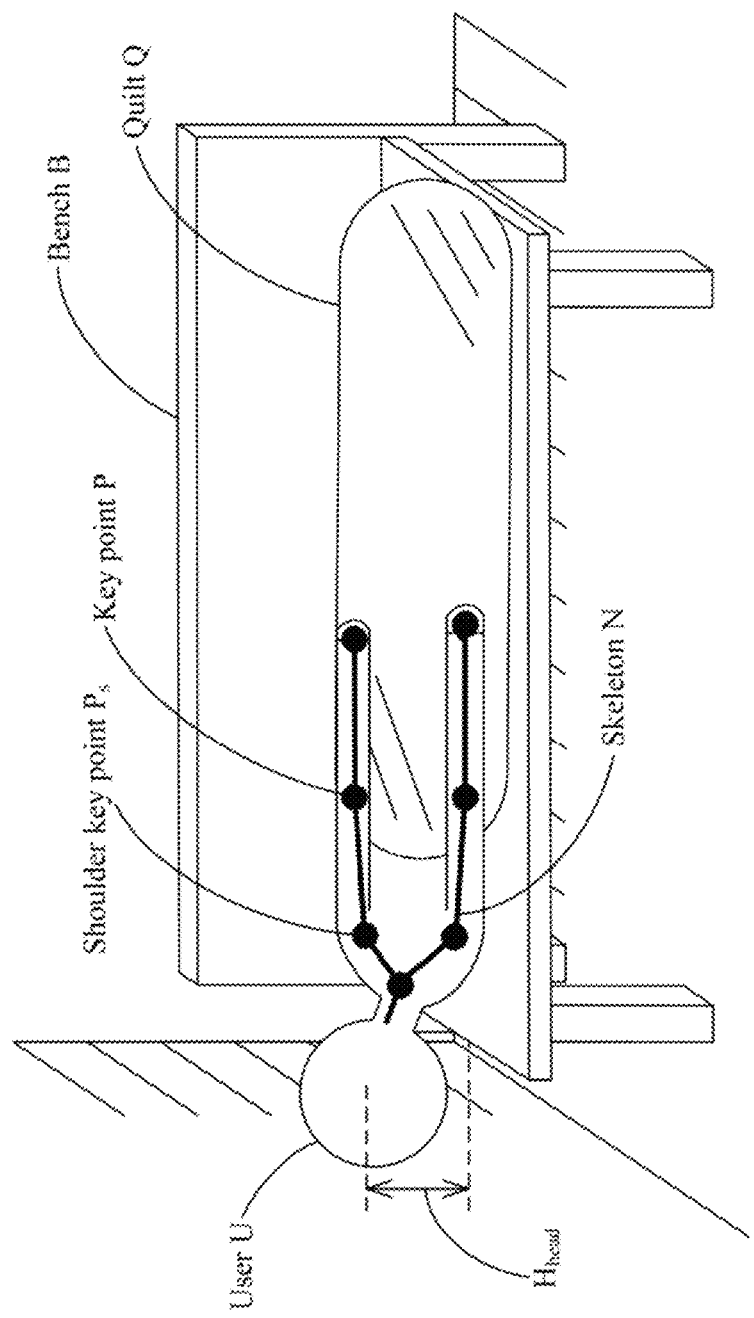
FIG. 12 is a schematic diagram of scenario 3 of the posture determination of FIGS. 5A and 5B.

In the posture determination process of FIGS. 5A and 5B, at step 470, a determination is made whether or not the detected key points P include a plurality of head key points $P_d$ among the predefined key points P. FIG. 12 is a schematic diagram of scenario 3 of the posture determination of FIGS. 5A and 5B. In scenario 3 that may have more than half of the body of the user U is occluded or does not locate within the field of view V of the camera C but (some or all of) the head key points $P_d$ are detected, steps 480 and 490 in FIGS. 5A and 5B will be performed to determine the posture of the user U. For instance, because the user U lies on the bench B before the camera C of the mobile machine 100 and there is a quilt Q that occlude a part of the body of the user U, only the head key points $P_d$ (e.g., two or more of the two eye key points, the nose key point, and the two ear key points) (and the two shoulder key points $P_s$, the two elbow key points, and the two hand key points) among the above-mentioned 18 predefined key points P can detected. It should be noted that, the 5 head key points $P_d$ (i.e., the two eye key points, the nose key point, and the two ear key points) are not shown in the figure. If the detected key points P include a plurality of head key points $P_d$, step 480 will be performed; otherwise, the method will be ended. At step 480, a head height $H_{head}$ is calculated based on the head key points $P_d$. The head height $H_{head}$ is the height of (the eyes on) the head with respect to the ground. Because the relative height and angle of the camera C with respect to the ground are known, the head height $H_{head}$ can be calculated based on the position of the head in the camera coordinate system. For example, when the user U is sitting on the chair C, the head height U is the height of the head with respect to the floor F (see FIG. 8), and when the user U is standing on the floor F, the head height $H_{head}$ is also the height of the head with respect to the floo (see FIG. 6).

At step 490, the posture of the user U is determined by comparing the head height $H_{head}$ with a first head height threshold (e.g., 120 cm) for distinguishing a standing posture and a sitting posture and a second head height threshold (e.g., 50 cm) for distinguishing the sitting posture and a lying posture. In the case that head height $H_{head}$ is larger than the first head height threshold, the user U will be determined as at the standing posture; in the case that head height $H_{head}$ is between the first head height threshold and the second head height threshold, the user U will be determined as at the sitting posture; and in the case that head height $H_{head}$ is smaller than the second head height threshold, the user U will be determined as at the lying posture. For instance, for the lying user U of FIG. 12, since the head height $H_{head}$ (e.g., 30 cm) is smaller than the second head height threshold, the user U will be determined as at the lying posture. In some embodiments, the first head height threshold and the second head height threshold may be changed according to, for example, the height of the user U. In other embodiments, all the steps for the above-mentioned three scenarios (i.e., steps 445, 452 and 462 for scenario 1, steps 444, 453 and 463 for scenario 2, and steps 480 and 490 for scenario 3) may be performed without the determination steps (i.e., steps 441, 446, and 470). Then, the determination results of the three scenarios that correspond to each frame (i.e., image pair G) may be combined with a maximum vote to determine the posture of the user U.

In other embodiments, in the human posture determination method (incorporated with the posture determination process), since human would not frequently change postures within millisecond time scale, a time-window (e.g., 1 second) may be added for filtering out the invalid results to realize a more accurate and robust posture determination. For instance, for a plurality of adjacent frames within a time-window, the determination results of the above-mentioned three scenarios that correspond to each frame with a maximum vote are combined to make a decision of human posture, and then the posture of the user U is determined in the case that all the decisions within the time-window are the same. It should be noted that the size of the time-window (which represents how many adjacent frames will be accumulated) may be defined according to actual needs. For example, the size of the time-window may be defined as dynamically adapted based on how close the current feature values to the corresponding threshold curve, and the closer to the threshold curve, the smaller the size and vice versa.

The human posture determination method is adaptable to different sets of detected key points because it uses pre-defined feature maps for describing humane postures to determine human posture on the basis of detected key points. By using unique pre-defined features and feature maps, it is capable of determining human postures in an accurate way. The human posture determination method can be realized in a real-time manner while only a few computation resources are need, and is economic and efficient because only an RGB-D camera rather than a plurality of sensors are need for detection. In the case that a mobile machine realizing the human posture determination meth is a mobility aid robot, it can determine the posture of a human so as to choose a suitable way to interact with the human accordingly. For example, when the human is an old person who is determined as having lied down, the mobile machine can ask the human to sit first before providing further aids.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned human posture determination method and mobile machine 100 may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A human posture determination method, comprising:
    obtaining, through a range camera, one or more range images, wherein the one or more range images include color data and depth data;
    detecting key points of an estimated skeleton of a human in the color data and calculating positions of the detected key points based on the depth data, wherein the estimated skeleton has a set of predefined key points;
    choosing a feature map from a set of predefined feature maps based on the detected key points among the predefined key points;
    obtaining two features of a body of the human corresponding to the chosen feature map based on the positions of the detected key points; and
    determining a posture of the human according to the two features in the chosen feature map;
    wherein when the detected key points comprise at least a shoulder key point, at least a hip key point, and at least a knee key point among the predefined key points, a second feature map with the two features of a body ratio and an upper body angle is chosen from the set of predefined feature maps, and the second feature map comprises: a first threshold curve for distinguishing a standing posture and a sitting posture, and a second threshold curve for distinguishing a lying posture, the standing posture, and the sitting posture; and
    when the determined posture is not the lying posture and the detected key points comprise all the predefined key points, a first feature map with the two features of an internal angle and the body ratio is chosen from the set of predefined feature maps, and the first feature map comprises a threshold curve for distinguishing the standing posture and the sitting posture.

2. The method of claim 1,
    wherein when the first feature map is chosen, the obtaining the two features of the body of the human corresponding to the chosen feature map based on the positions of the detected key points comprises:
    in response to the detected key points including all the predefined key points, obtaining a detected internal angle of the body of the human and a detected body ratio of the body of the human based on the positions of the detected key points; and
    the determining the posture of the human according to the two features in the chosen feature map comprises:
    in response to the detected key points including all the predefined key points, determining the posture of the human based on a position of an intersection of the detected internal angle and the detected body ratio in the first feature map.

3. The method of claim 2, wherein the obtaining the internal angle and the body ratio based on the positions of the key points comprises:
    obtaining a middle position $p_h$ between the positions of two hip key points among the detected key points;
    obtaining an upper body plane based on the middle position $p_h$ and the positions of two shoulder key points among the detected key points;
    obtaining a lower body plane based on the middle position $p_h$ and the positions of two knee key points among the detected key points;
    obtaining an angle between the upper body plane and the lower body plane to take as the internal angle;
    obtaining a ratio between a lower body height $h_{low}$ and an upper body height $h_{up}$ to take as the body ratio, wherein $h_{up} = p_s \cdot y - p_h \cdot y$ and $h_{low} = p_h \cdot y - p_k \cdot y$, $p_s$ is a middle position between the positions of the two shoulder key points, $p_s \cdot y$ is a y coordinate of $p_s$, $p_h \cdot y$ is a y coordinate of $p_h$, $p_k$ is a middle position between the positions of the two knee key points, and $p_k \cdot y$ is a y coordinate of $p_k$; and
    the determining the posture of the human based on the position of the intersection of the internal angle and the body ratio in the first feature map comprises:
    determining the posture of the human according to the position of the intersection of the internal angle and the body ratio in the first feature map with respect to the threshold curve for distinguishing the standing posture and the sitting posture.

4. The method of claim 1,
    wherein when the second feature map is chosen, the obtaining the two features of the body of the human corresponding to the chosen feature map based on the positions of the detected key points comprises:
    in response to the detected key points including at least a shoulder key point, at least a hip key point, and at least a knee key point among the predefined key points, obtaining a detected body ratio of the body of the human and a detected upper body angle of the body of the human based on the positions of the detected key points; and
    the determining the posture of the human according to the two features in the chosen feature map comprises:

in response to the detected key points including at least a shoulder key point, at least a hip key point, and at least a knee key point among the predefined key points, determining the posture of the human based on a position of an intersection of the detected body ratio and the detected upper body angle in the second feature map.

5. The method of claim 4, wherein the obtaining the body ratio and the upper body angle based on the positions of the detected key points comprises:
obtaining a middle position $p_h$ between the positions of two hip key points among the detected key points;
obtaining a ratio between a lower body height $h_{low}$ and an upper body height $h_{up}$ to take as the body ratio, wherein $h_{up} = p_s \cdot y - p_h \cdot y$ and $h_{low} = p_h \cdot y \, p_k \cdot y$, $p_s$ is a middle position between the positions of two shoulder key points, $p_s \cdot y$ is a y coordinate of $p_s$, $p_h \cdot y$ is a y coordinate of $p_h$, $p_k$ is a middle position between the positions of two knee key points, and $p_k \cdot y$ is a y coordinate of $p_k$;
obtaining an angle between a vector $\vec{v}_{hs}$ between the middle position $p_h$ and the middle position $p_s$ and a unit vector $\vec{y}$ in y-direction to take as the upper body angle; and
the determining the posture of the human based on the position of the intersection of the body ratio and the upper body angle in the second feature map comprises:
determining the posture of the human according to the position of the intersection of the body ratio and the upper body angle in the second feature map with respect to the first threshold curve for distinguishing the standing posture and the sitting posture and the second threshold curve for distinguishing the lying posture, the standing posture, and the sitting posture.

6. The method of claim 5, further comprising:
in response to the detected key points including one shoulder key point, obtaining the position of another of the two shoulder key points based on the position of the detected shoulder key point;
in response to the detected key points including one hip key point, obtaining the position of another of the two hip key points based on the position of the detected hip key point; and
in response to the detected key points including one knee key point, obtaining the position of another of the two knee key points based on the position of the detected knee key point.

7. The method of claim 1, further comprising:
in response to the detected key points including a plurality of head key points among the predefined key points, calculating a head height $H_{head}$ based on the head key points; and
determining the posture of the human by comparing the head height $H_{head}$ with a first head height threshold for distinguishing a standing posture and a sitting posture and a second head height threshold for distinguishing the sitting posture and a lying posture.

8. The method of claim 1, wherein the predefined key points include two eye key points, a nose key point, two ear key points, a neck key point, two shoulder key points, two elbow key points, two hand key points, two hip key points, two knee key points, and two foot key points, and wherein the two eye key points, the nose key point, and the two ear key points are referred to as head key points.

9. A mobile machine, comprising:
a range camera;
one or more processors; and
a memory storing one or more programs configured to be executed by the one or more processors, wherein the one or more programs include instructions to:
obtain, through the range camera, one or more range images, wherein the one or more range images include color data and depth data;
detect key points of an estimated skeleton of a human in the color data and calculating positions of the detected key points based on the depth data, wherein the estimated skeleton has a set of predefined key points;
choose a feature map from a set of predefined feature maps based on the detected key points among the predefined key points;
obtain two features of a body of the human corresponding to the chosen feature map based on the positions of the detected key points; and
determine a posture of the human according to the two features in the chosen feature map;
wherein when the detected key points comprise at least a shoulder key point, at least a hip key point, and at least a knee key point among the predefined key points, a second feature map with the two features of a body ratio and an upper body angle is chosen from the set of predefined feature maps, and the second feature map comprises: a first threshold curve for distinguishing a standing posture and a sitting posture, and a second threshold curve for distinguishing a lying posture, the standing posture, and the sitting posture; and
when the determined posture is not the lying posture and the detected key points comprise all the predefined key points, a first feature map with the two features of an internal angle and the body ratio is chosen from the set of predefined feature maps, and the first feature map comprises a threshold curve for distinguishing the standing posture and the sitting posture.

10. The mobile machine of claim 9,
wherein when the first feature map is chosen, the obtaining the two features of the body of the human corresponding to the chosen feature map based on the positions of the detected key points comprises:
in response to the detected key points including all the predefined key points, obtaining a detected internal angle of the body of the human and a detected body ratio of the body of the human based on the positions of the detected key points; and
the determining the posture of the human according to the two features in the chosen feature map comprises:
in response to the detected key points including all the predefined key points, determining the posture of the human based on a position of an intersection of the detected internal angle and the detected body ratio in the first feature map.

11. The mobile machine of claim 10, wherein the obtaining the internal angle and the body ratio based on the positions of the key points comprises:
obtaining a middle position $p_h$ between the positions of two hip key points among the detected key points;
obtaining an upper body plane based on the middle position $p_h$ and the positions of two shoulder key points among the detected key points;
obtaining a lower body plane based on the middle position $p_h$ and the positions of two knee key points among the detected key points;
obtaining an angle between the upper body plane and the lower body plane to take as the internal angle;
obtaining a ratio between a lower body height $h_{low}$ and an upper body height $h_{up}$ to take as the body ratio, wherein $h_{up}=p_s \cdot y - p_h \cdot y$ and $h_{low}=p_h \cdot y - p_k \cdot y$, $p_s$ is a middle position between the positions of the two shoulder key points, $p_s \cdot y$ is a y coordinate of $p_s$, $p_h \cdot y$ is a y coordinate of $p_h$, $p_k$ is a middle position between the positions of the two knee key points, and $p_k \cdot y$ is a y coordinate of $p_k$; and the determining the posture of the human based on the position of the intersection of the internal angle and the body ratio in the first feature map comprises:

determining the posture of the human according to the position of the intersection of the internal angle and the body ratio in the first feature map with respect to the threshold curve for distinguishing the standing posture and the sitting posture.

12. The mobile machine of claim 9,
wherein when the second feature map is chosen, the obtaining the two features of the body of the human corresponding to the chosen feature map based on the positions of the detected key points comprises:

in response to the detected key points including at least a shoulder key point, at least a hip key point, and at least a knee key point among the predefined key points, obtaining a detected body ratio of the body of the human and a detected upper body angle of the body of the human based on the positions of the detected key points; and the determining the posture of the human according to the two features in the chosen feature map comprises:

in response to the detected key points including at least a shoulder key point, at least a hip key point, and at least a knee key point among the predefined key points, determining the posture of the human based on a position of an intersection of the detected body ratio and the detected upper body angle in the second feature map.

13. The mobile machine of claim 12, wherein the obtaining the body ratio and the upper body angle based on the positions of the detected key points comprises:

obtaining a middle position $p_h$ between the positions of two hip key points among the detected key points;

obtaining a ratio between a lower body height $h_{low}$ and an upper body height $h_{up}$ to take as the body ratio, wherein $h_{up}=p_s \cdot y - p_h \cdot y$ and $h_{low}=p_h \cdot y - p_k \cdot y$, $p_s$ is a middle position between the positions of two shoulder key points, $p_s \cdot y$ is a y coordinate of $p_s$, $p_h \cdot y$ is a y coordinate of $p_h$, $p_k$ is a middle position between the positions of two knee key points, and $pk \cdot y$ is a y coordinate of $p_k$;

obtaining an angle between a vector $\vec{v}_{hs}$ between the middle position $p_h$ and the middle position $p_s$, and a unit vector $\vec{y}$ in y-direction to take as the upper body angle; and the determining the posture of the human based on the position of the intersection of the body ratio and the upper body angle in the second feature map comprises:

determining the posture of the human according to the position of the intersection of the body ratio and the upper body angle in the second feature map with respect to the first threshold curve for distinguishing the standing posture and the sitting posture and the second threshold curve for distinguishing the lying posture, the standing posture, and the sitting posture.

14. The mobile machine of claim 13, wherein the one or more programs further include instructions to:

in response to the detected key points including one shoulder key point, obtain the position of another of the two shoulder key points based on the position of the detected shoulder key point;

in response to the detected key points including one hip key point, obtain the position of another of the two hip key points based on the position of the detected hip key point; and in response to the detected key points including one knee key point, obtain the position of another of the two knee key points based on the position of the detected knee key point.

15. The mobile machine of claim 9, wherein the one or more programs further include instructions to:

in response to the detected key points including a plurality of head key points among the predefined key points, calculate a head height $H_{head}$ based on the head key points; and determine the posture of the human by comparing the head height $H_{head}$ with a first head height threshold for distinguishing a standing posture and a sitting posture and a second head height threshold for distinguishing the sitting posture and a lying posture.

16. The mobile machine of claim 9, wherein the predefined key points include two eye key points, a nose key point, two ear key points, a neck key point, two shoulder key points, two elbow key points, two hand key points, two hip key points, two knee key points, and two foot key points, and wherein the two eye key points, the nose key point, and the two ear key points are referred to as head key points.

17. The method of claim 8, further comprising:

determining whether the detected key points comprise all the predefined key points, when the determined posture is not the lying posture;

in response to the detected key points not comprising all the predefined key points, determining whether or not the detected key points comprising at least a shoulder key point, at least a hip key point, and at least a knee key point among the predefined key points;

in response to the detected key points comprising at least a shoulder key point, at least a hip key point, and at least a knee key point among the predefined key points, obtaining a detected body ratio of the body of the human based on the positions of the detected key points; and determining the posture of the human based on a position of an intersection of the detected body ratio in the first feature map.

18. The method of claim 17, further comprising:

determining whether or not the detected key points comprise a plurality of the head key points among the predefined key points, in response to the detected key points not comprising all the predefined key points, and the detected key points not comprising at least a shoulder key point, at least a hip key point, and at least a knee key point among the predefined key points;

in response to the detected key points comprising the plurality of the head key points, calculating a head height based on the plurality of the head key points;

comparing the head height with a first head height threshold for distinguishing the standing posture and the sitting posture, and a second head height threshold for distinguishing the sitting posture and the lying posture;

in response to the head height being larger than the first head height threshold, determining that the posture of the human is the standing posture;

in response to the head height being between the first head height threshold and the second head height threshold, determining that the posture of the human is the sitting posture; and in response to the head height being smaller than the second head height threshold, determining that the posture of the human is the lying posture.

19. The method of claim 1, wherein each of the predefined feature maps comprises values corresponding to features for distinguishing postures and is used to classify the detected key points, and postures of the human in each of the predefined feature maps are separated using a maximum margin from each posture region in each of the predefined feature maps.

20. The method of claim 1, wherein feature values shown in the first feature map and the second feature map are normalized values with mean and scale.

\* \* \* \* \*